(12) United States Patent
Smelyansky (10) Patent No.: US 9,325,940 B2
(45) Date of Patent: Apr. 26, 2016

(54) VIDEO CLASS ROOM

(75) Inventor: Vladimir Smelyansky, Glenview, IL (US)

(73) Assignee: NEXTCAST LABS, Inc., West Palm Beach, FL (US)

( * ) Notice: Subject to any disclaimer, the term of this patent is extended or adjusted under 35 U.S.C. 154(b) by 284 days.

(21) Appl. No.: 12/779,794

(22) Filed: May 13, 2010

(65) Prior Publication Data

US 2011/0283008 A1   Nov. 17, 2011

(51) Int. Cl.
| | |
|---|---|
| G06F 15/16 | (2006.01) |
| H04N 7/15 | (2006.01) |
| G09B 5/06 | (2006.01) |
| H04L 29/06 | (2006.01) |

(52) U.S. Cl.
CPC ............... H04N 7/15 (2013.01); G09B 5/065 (2013.01); H04L 65/4038 (2013.01)

(58) Field of Classification Search
CPC ............ H04L 29/06027; H04L 29/06523; H04L 29/06462; H04L 29/06; H04L 29/08072
USPC ......... 709/231, 232, 233, 234, 235, 236, 237, 709/238
See application file for complete search history.

(56) References Cited

U.S. PATENT DOCUMENTS

| | | | |
|---|---|---|---|
| 7,143,177 B1 * | 11/2006 | Johnson et al. | 709/231 |
| 7,869,387 B2 * | 1/2011 | Black | 370/260 |
| 8,290,038 B1 * | 10/2012 | Wang et al. | 375/240.02 |
| 2003/0152904 A1 * | 8/2003 | Doty, Jr. | 434/350 |
| 2003/0236912 A1 * | 12/2003 | Klemets et al. | 709/236 |
| 2006/0140591 A1 * | 6/2006 | Estevez et al. | 386/105 |
| 2007/0280349 A1 * | 12/2007 | Prieto et al. | 375/240.03 |
| 2008/0216140 A1 * | 9/2008 | Liwerant et al. | 725/113 |
| 2010/0002069 A1 * | 1/2010 | Eleftheriadis et al. | 348/14.08 |
| 2010/0040349 A1 * | 2/2010 | Landy | 386/96 |
| 2010/0162331 A1 * | 6/2010 | Belz et al. | 725/106 |
| 2010/0322592 A1 * | 12/2010 | Casagrande | 386/241 |
| 2011/0255535 A1 * | 10/2011 | Tinsman | 370/390 |
| 2011/0255555 A1 * | 10/2011 | Alexander | 370/468 |

* cited by examiner

*Primary Examiner* — Philip Chea
*Assistant Examiner* — Van Kim T Nguyen
(74) *Attorney, Agent, or Firm* — Smith, Gambrell & Russell, LLP

(57) ABSTRACT

A method, system, and computer program product for providing full two-way interaction among participants at a large number of locations. A method for providing presentation services may comprise receiving an audio stream and a plurality of video streams of a presentation, wherein at least some of the plurality of transmitted video streams have different frame rates, resolutions, or both, receiving an audio stream and a video stream of each of a plurality of participants to the presentation, selectively transmitting the audio stream and the plurality of video streams of the presentation and the audio stream and the video stream of each of the plurality of participants to a presentation location and to each of the plurality of participants.

39 Claims, 6 Drawing Sheets

Fig. 1b

Fig. 2
Audio - Video Coordination

VIDEO CLASS ROOM

BACKGROUND OF THE INVENTION

1. Field of the Invention

The present invention relates to a method, system, and computer program product for providing the capability for a speaker to remotely interact with a plurality of others via a network serving associated computers.

2. Description of the Related Art

Currently there are a number of video conferencing and telepresence services available. Typically, these services allow users at a location to interact with users at another location. Although these services typically allow two-way audio and video interaction between users, the number of locations that they support is generally quite limited. In addition, there are presentation services that allow a presentation to be delivered to multiple locations. Although these presentation services can handle multiple locations, and in some cases, large numbers of locations, they are essentially one-way services, which provide, at best, very limited two-way interaction, such as instant message type services. A need arises for a technology that provides full two-way interaction among participants at a large number of locations.

SUMMARY OF THE INVENTION

A method, system, and computer program product for providing full two-way interaction among participants at a large number of locations.

For example, a method for providing presentation services may comprise receiving an audio stream and a plurality of video streams of a presentation, wherein at least some of the plurality of transmitted video streams have different frame rates, resolutions, or both, receiving an audio stream and a video stream of each of a plurality of participants to the presentation, selectively transmitting the audio stream and the plurality of video streams of the presentation and the audio stream and the video stream of each of the plurality of participants to a presentation location and to each of the plurality of participants.

Each of the audio stream and the plurality of video streams of the presentation and the audio stream and the video stream of each of the plurality of participants may be selectively independently transmitted to the presentation location and to each of the plurality of participants. Each of the audio stream and the plurality of video streams of the presentation and the audio stream and the video stream of each of the plurality of participants may be selectively transmitted as a one-to-one, a one-to-many, a many-to-one, or a many-to-many transmission. Each of the audio stream and the plurality of video streams of the presentation and the audio stream and the video stream of each of the plurality of participants may be further selectively independently transmitted to the presentation location and to each of the plurality of participants.

The audio stream and the plurality of video streams of the presentation may be captured using a computer system at the presentation location, the audio stream and the video stream of each of a plurality of participants to the presentation may be captured using a computer system at each participant location, all of the audio stream and the plurality of video streams of the presentation and the audio stream and the video stream of each of the plurality of participants may be transmitted to a network server. The network server may selectively transmit the received audio stream and plurality of video streams of the presentation and audio stream and video stream of each of the plurality of participants to the presentation location and to each of the plurality of participants.

The selection of transmission of the audio stream and the plurality of video streams of the presentation and the audio stream and the video stream of each of the plurality of participants may be controlled using the computer system at the presentation location. The frame rate and resolution of each video stream may be determined, adjusted, or converted depending on the subject matter of the video stream and the number of participants in order to provide a determined service or quality of service.

For another example, a system for providing presentation services may comprise a computer system at a presentation location to capture an audio stream and a plurality of video streams of a presentation and transmit the captured audio stream and plurality of video streams to a network server, wherein at least some of the plurality of transmitted video streams have different frame rates, resolutions, or both, a plurality of computer systems, each computer system at a participant location, to capture the audio stream and the video stream of each of a plurality of participants to the presentation, and to transmit each captured audio stream and video stream to the network server, and a network server to receive the audio stream and the plurality of video streams of the presentation and the audio stream and the video stream of each of the plurality of participants to the presentation and to selectively transmit the received audio stream and plurality of video streams of the presentation and audio stream and video stream of each of the plurality of participants to the computer system at the presentation location and to each computer system at each of the plurality of participant locations.

Each of the audio stream and the plurality of video streams of the presentation and the audio stream and the video stream of each of the plurality of participants may be selectively independently transmitted to the computer system at the presentation location and to each computer system at each of the plurality of participant locations. Each of the audio stream and the plurality of video streams of the presentation and the audio stream and the video stream of each of the plurality of participants may be selectively transmitted as a one-to-one, a one-to-many, a many-to-one, or a many-to-many transmission. Each of the audio stream and the plurality of video streams of the presentation and the audio stream and the video stream of each of the plurality of participants may be further selectively independently transmitted to the presentation location and to each of the plurality of participants. The network server may selectively transmit the received audio stream and plurality of video streams of the presentation and audio stream and video stream of each of the plurality of participants to the presentation location and to each of the plurality of participants.

The selection of transmission of the audio stream and the plurality of video streams of the presentation and the audio stream and the video stream of each of the plurality of participants may be controlled using the computer system at the presentation location. The frame rate and resolution of each video stream may be determined, adjusted, or converted depending on the subject matter of the video stream and the number of participants in order to provide a determined service or quality of service.

BRIEF DESCRIPTION OF THE DRAWINGS

The details of the present invention, both as to its structure and operation, can best be understood by referring to the accompanying drawings, in which like reference numbers and designations refer to like elements.

FIG. 1b is an exemplary block diagram of a presenter location shown in FIG. 1a.

FIG. 2 is an exemplary diagram of contact audio-video coordination in the network system shown in FIG. 1a.

FIG. 3 is an exemplary flow diagram of a process of operation of the system shown in FIG. 1a.

FIG. 4 is an exemplary block diagram of a presenter station shown in FIG. 1a.

DETAILED DESCRIPTION OF THE INVENTION

A method, system, and computer program product for providing full two-way interaction among participants at a large number of locations.

Figure 1A:
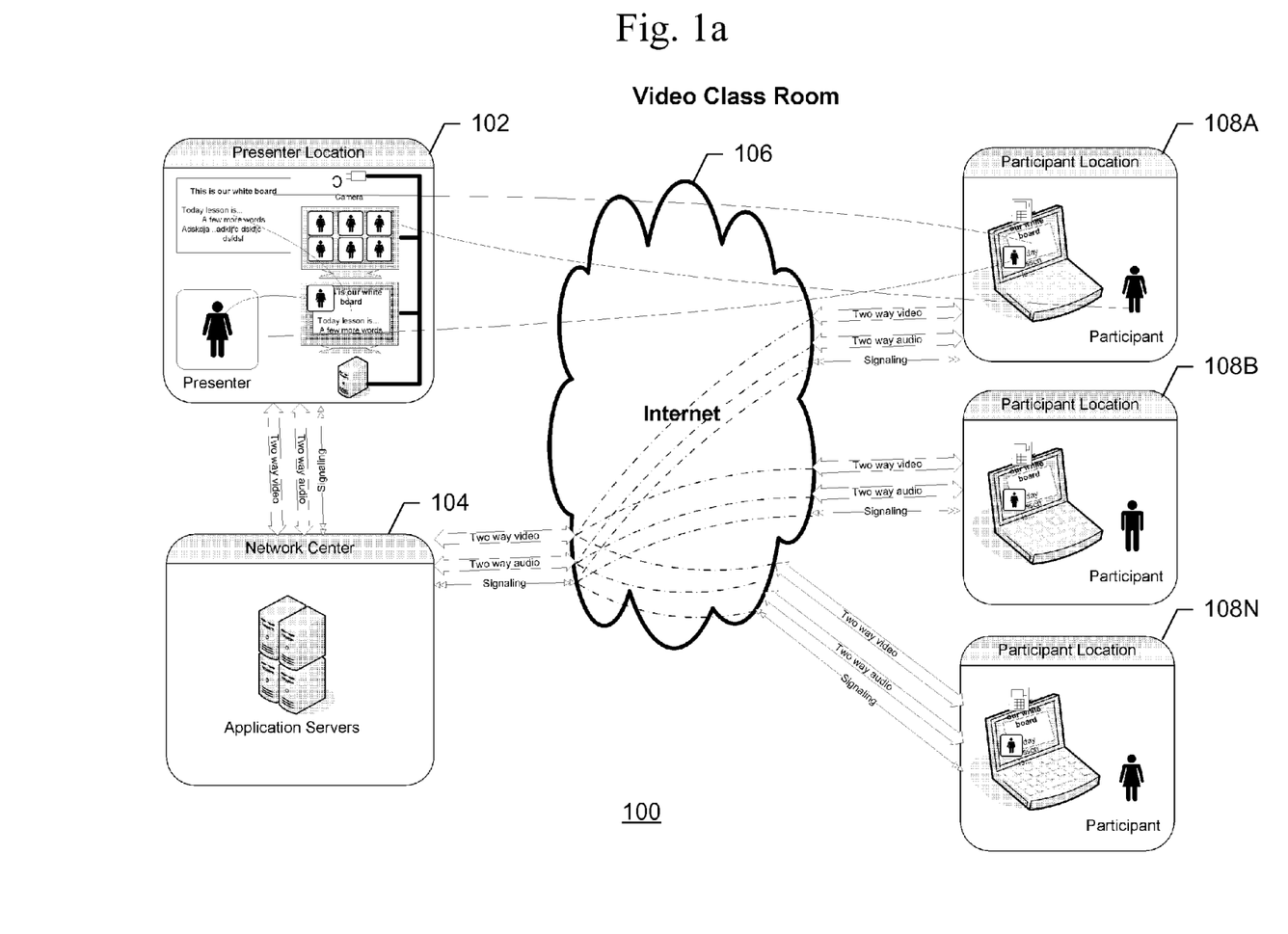
FIG. 1a is an exemplary block diagram of a network system in which the present invention may be implemented.

As an example, such features may be provided in a system 100, such as that shown in FIG. 1a. System 100 includes a presenter location 102, such as a classroom, a network center 104, a network 106, and a plurality of computer systems at remote locations, such as participant computers 108A-N. Presenter location 102 is a location, such as a classroom, where a presenter and/or moderator, such as a teacher or conference moderator, provides a presentation, such as a lecture, recitation, etc. and/or moderates an interactive session, such as a discussion, question and answer session, etc. Presenter location 102 is linked to network center 104, which includes plural application servers which provide the computing power needed to provide the presentation services. Network center 104 is further linked to remotely located computers 108A-N via network 106. Network 106, which may include any type of private or public data network, such as a LAN, a WAN, the Internet, etc., connects presenter location 102 and participant computers 108A-N for carrying two way voice, video, and data between presenter location 102 and participant computers 108A-N.

One use for the technology described herein is to provide two-way interaction between a teacher, who may be located in a school classroom, and students, who may be at remote locations. However, this is merely one possible use. The present invention is not limited to such a use and in fact, contemplates any use in which two-way interaction is desired.

Figure 1B:
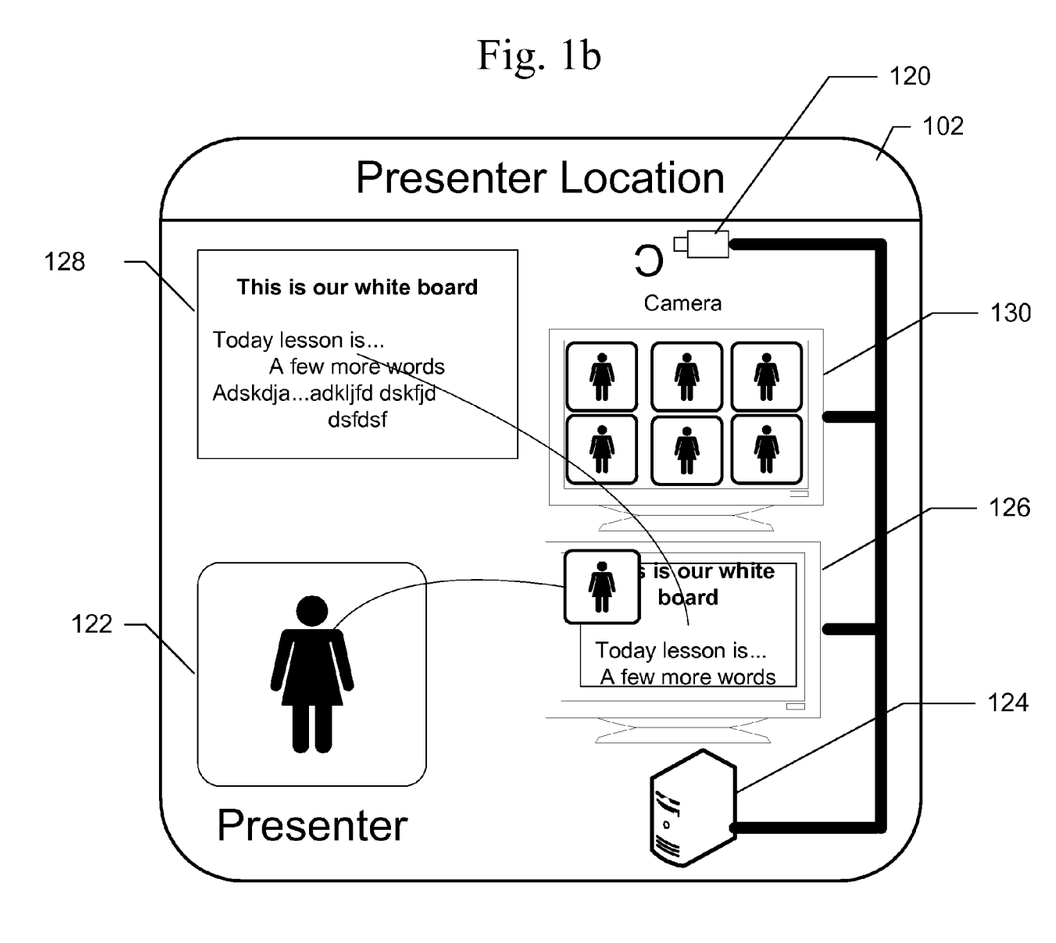

An example of a presenter location 102 is shown in FIG. 1b. Presenter location 102 typically includes a plurality of video cameras 120 for capturing presenter 122 images and delivering to a local server 124 for processing. The local server 124 displays the presenter images on a screen in the presenter location 102 and transmits images composed by the presenter to an application in a server in network center 104, shown in FIG. 1. A white board 128 in presenter location 102 may be used for presentation purposes. The white board is monitored by a local server 124 (another server or the same server) for display 126 in the presenter location 102. The white board 128 image is composed by a local server 124 (another server or the same server) for transmission to an application in a server in network center 104. A graphical user interface 130 is viewed by the presenter. The graphical user interface 130 is also serviced by a local server 124 (another server or the same server) to allow multiple participants to be viewed by the presenter and multiple streams of data to be sent to the plurality of participant computers 108A-N. The application(s) in a server in network center 104 is connected to a WAN and is responsible for retransmission of the composed images to the multiple participant computers 108A-N and back to the presenter. The choice of which servers handle which tasks, how many servers are to be used, and other similar issues, are implementation decisions to be based on factors such as the number of remote locations to be serviced and on the computing power of the available servers. The present invention contemplates any and all such implementations that may be used.

Returning to FIG. 1a, each participant computer 108A-N is connected to or includes a webcam or similar camera. Each participant computer 108A-N processes images of the associated participant captured by the webcam for delivery to the application server. A new image is constructed by the application server of all the participants and is displayed on the graphical interface to the presenter in the presenter location 102. The presenter image and the whiteboard images are received for display on the participant computers 108A-N. The presenter image may be displayed in an image frame within the white board image frame of each participant computer 108A-N or the presenter image and white board image may be presented as separate frames. Such display parameters may be configurable on a per participant computer basis and may be adjustable by each participant. Each participant computer 108A-N may receive at least two video streams—one for the white board and one for the presenter. Optionally, participant computers 108A-N may have third video stream that shows other participants.

The presenter instruction is delivered on the presenter screen and the white board. The instruction in voice and image is transmitted to the participant computers 108A-N. The presenter can observe participant attention to the instruction on the graphical interface. A participant may ask questions by text or by voice. An image of the participant asking questions or commenting on the instruction can be broadcast to all participants and displayed on the participant computers 108A-N.

The separation of video streams (presenter, whiteboard, participant) is important to providing good quality presentation service. In particular, the frame rate and resolution of each video stream may be determined, adjusted, or converted depending on the subject matter of the video stream, the number of participants, etc., in order to provide the determined service or quality of service. For example, the white board video stream may be transmitted with a low frame rate, such as 2 frames per second, but high resolution is preferred. The presenter video stream preferably may have a higher frame rate, such as 15 frames per second or more, to capture rapid movements, but intermediate resolution, such as 320× 240 pixels resolution is likely adequate. The participant streams preferably may have lower resolution and frame rate, such as 5-10 frames per second.

The system provides the capability to selectively transmit the video/audio streams in a number of arrangements, such as one-to-many, many-to-one, and many-to-many video/audio streams. For example, all participants may see the presenter and, optionally, the white/blackboard, as well as any presentation displayed by the presenter's computer (one-to-many). The presenter will see all participants at the same time (many-to-one). The presenter will be able to share the image/video of any participant or participant's monitor with others (adjustments) by utilizing the user interface provided to the presenter (screen, audio). Likewise, the audio stream could be many-to-one (all to presenter), one-to-many (presenter to all participants), many-to-many (all can hear all) based on presenter decision.

The audio and video streams may be selectively transmitted independently of each other. Likewise, each audio or video stream may be configured independently of any other. For example, the presenter's video stream may be transmitted to all participants (one-to-many), while the participant's video streams may all be transmitted to presenter (many-to-one). Independently, the presenter's audio stream may be transmitted to all participants (one-to-many), while the participant's audio streams may be transmitted to the presenter and to all the participants (many-to-many). At the same time a specific participant's audio stream may be transmitted only to the presenter (one-to-one) so that a private conversation may be held. This is merely an example of the configuration of audio and video streams that may be set. The present invention contemplates any and all such configurations.

In addition, the configuration of audio and video streams may be changed at any time. Such configuration changes may be made by the presenter, using a keyboard, mouse, graphical interface, voice recognition, etc., but such configuration changes may also be made automatically upon detection by the system of predefined conditions. For example, if a participant begins speaking, the system may detect this and automatically transmit that participant's audio and video stream to all participants. When the participant stops speaking, the system may detect this and automatically return to the default display. The system may be integrated with a voice recognition unit that would further enhance such configuration features. For example, in a classroom setting, the teacher may say "John Case asked what the speed of sound is." The system would recognize this speech, detect the name of the student, determine that the name is known, and determine which audio/video stream belongs to that student. This system may then alter the display of that student's audio/video stream as a result. System may also be trained to recognize the pattern "Student Name+asked". As soon as the teacher used that key combination, image of that student is broadcast to all others.

The presenter can increase voice volume of any of the participants, for example his own. In this case, all participants will be able to hear each other, but presenter voice would dominate.

Figure 2:
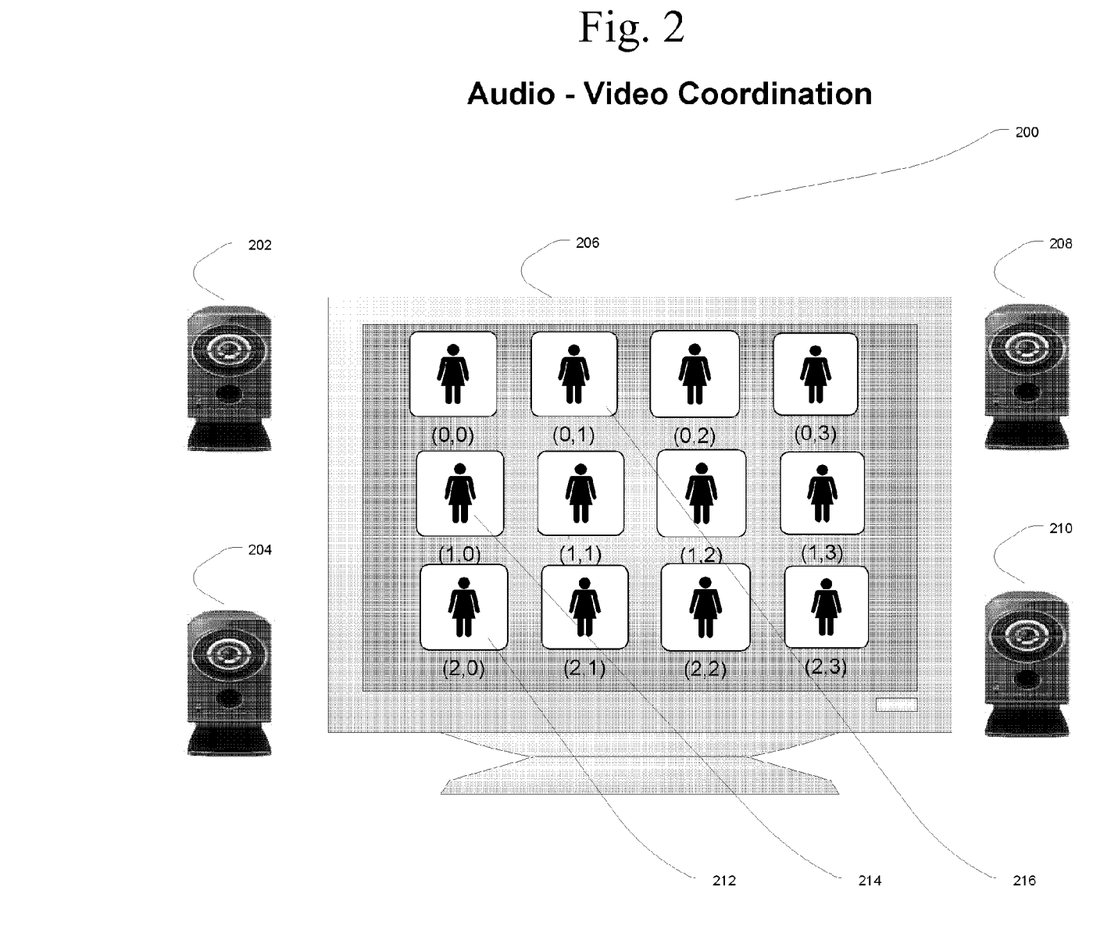

The normal human reaction is to see who is speaking based on the direction of the sound. The system can automatically detect who is speaking, and using multi-speaker audio capabilities, emulate from which part of the presenter's monitor audio is coming. That would allow the presenter to more easily determine which student is talking. An example of this spatial audio-video coordination in system 100 is shown in FIG. 2. FIG. 2 shows how audio associated with particular participants are associated with the video for those participants. System distributes audio coming from participants in proportion among multiple speakers 202, 204, 208 and 210 (four in this example) located around the monitor 206 that displays the participants in the conference.

The audio volume is distributed between four speakers 202, 204, 208, 210 based on a special function that depends on the location of the particular speaker on the screen. Each participant location on the screen can be mapped to two coordinates—row and column. The numeration will start from zero, so participant 212 is mapped to (2, 0) and participant 216 is mapped to (0, 1).

The volume that comes to the speakers 202, 204, 208, 210 from participant 212 may be calculated by special functions in the following way based on student (participant location):

Volume202=function202(0, 2)
Volume204=function204(0, 2)
Volume208=function208(0, 2)
Volume210=function210(0, 2)

The functions can be linear or logarithmic, or something else. An example of a linear function202 is:

$$\text{Volume}202 = k * V * (1 - x/2) * (1 - y/3),$$

where k is a multiplier, V is an original volume (energy) of the audio stream from participant (x, y) and x and y are corresponding participant coordinates as shown in FIG. 2.

Instead of using a function, the system may also use a table that matches the percentage of the original volume from a particular participant and the participant location on the screen to the speakers based on speakers' locations. An example of such tables is:

| Speaker 202 | | | |
|---|---|---|---|
| 100 (0, 0) | 67 (0, 1) | 33 (0, 2) | 0 (0, 3) |
| 50 (1, 0) | 33 (1, 1) | 17 (1, 2) | 0 (1, 3) |
| 0 (2, 0) | 0 (2, 1) | 0 (2, 2) | 0 (2, 3) |
| Speaker 204 | | | |
| 0 (0, 0) | 0 (0, 1) | 0 (0, 2) | 0 (0, 3) |
| 50 (1, 0) | 33 (1, 1) | 17 (1, 2) | 0 (1, 3) |
| 100 (2, 0) | 67 (2, 1) | 33 (2, 2) | 0 (2, 3) |
| Speaker 208 | | | |
| 0 (0, 0) | 33 (0, 1) | 67 (0, 2) | 100 (0, 3) |
| 0 (1, 0) | 17 (1, 1) | 33 (1, 2) | 50 (1, 3) |
| 0 (2, 0) | 0 (2, 1) | 0 (2, 2) | 0 (2, 3) |
| Speaker 210 | | | |
| 0 (0, 0) | 0 (0, 1) | 0 (0, 2) | 0 (0, 3) |
| 0 (1, 0) | 17 (1, 1) | 33 (1, 2) | 50 (1, 3) |
| 0 (2, 0) | 33 (2, 1) | 67 (2, 2) | 100 (2, 3) |

The numbers in the cells show the percentage of audio volume from each participant that is distributed to a speaker based on the participant's location on the screen, as shown in FIG. 2.

Another presentation for the same table is:

| Participant | Speaker 202 | Speaker 208 | Speaker 204 | Speaker 210 |
|---|---|---|---|---|
| (0, 0) | 100 | 0 | 0 | 0 |
| (0, 1) | 67 | 33 | 0 | 0 |
| (0, 2) | 33 | 67 | 0 | 0 |
| (0, 3) | 0 | 100 | 0 | 0 |
| (1, 0) | 50 | 0 | 50 | 0 |
| (1, 1) | 33 | 17 | 17 | 33 |
| (1, 2) | 17 | 33 | 17 | 33 |
| (1, 3) | 0 | 50 | 0 | 50 |
| (2, 0) | 0 | 0 | 100 | 0 |
| (2, 1) | 0 | 0 | 67 | 33 |
| (2, 2) | 0 | 0 | 33 | 67 |
| (2, 3) | 0 | 0 | 0 | 100 |

This technique is applicable to any number of speakers and can be scaled down to two speakers or expanded to more. In addition, when three dimensional video technology is used, the participants may be arranged in a three dimensional location display and speakers will reflect the three dimensional location of the participants as well.

The above-described audio-video coordination provide the capability to detect which student is talking and provides audio effects that would allow the presenter to identify in which part of monitor 206 a particular participant is shown. The system further allows the manipulation of the volume of each audio channel. For example, the presenter volume may be relatively high, while each participant may be at intermediate volume. This means that all participants can hear each other, but the presenter can easily speak over any of them.

This arrangement can apply to a single channel or any group of channels on presenter request or configuration.

Figure 3:
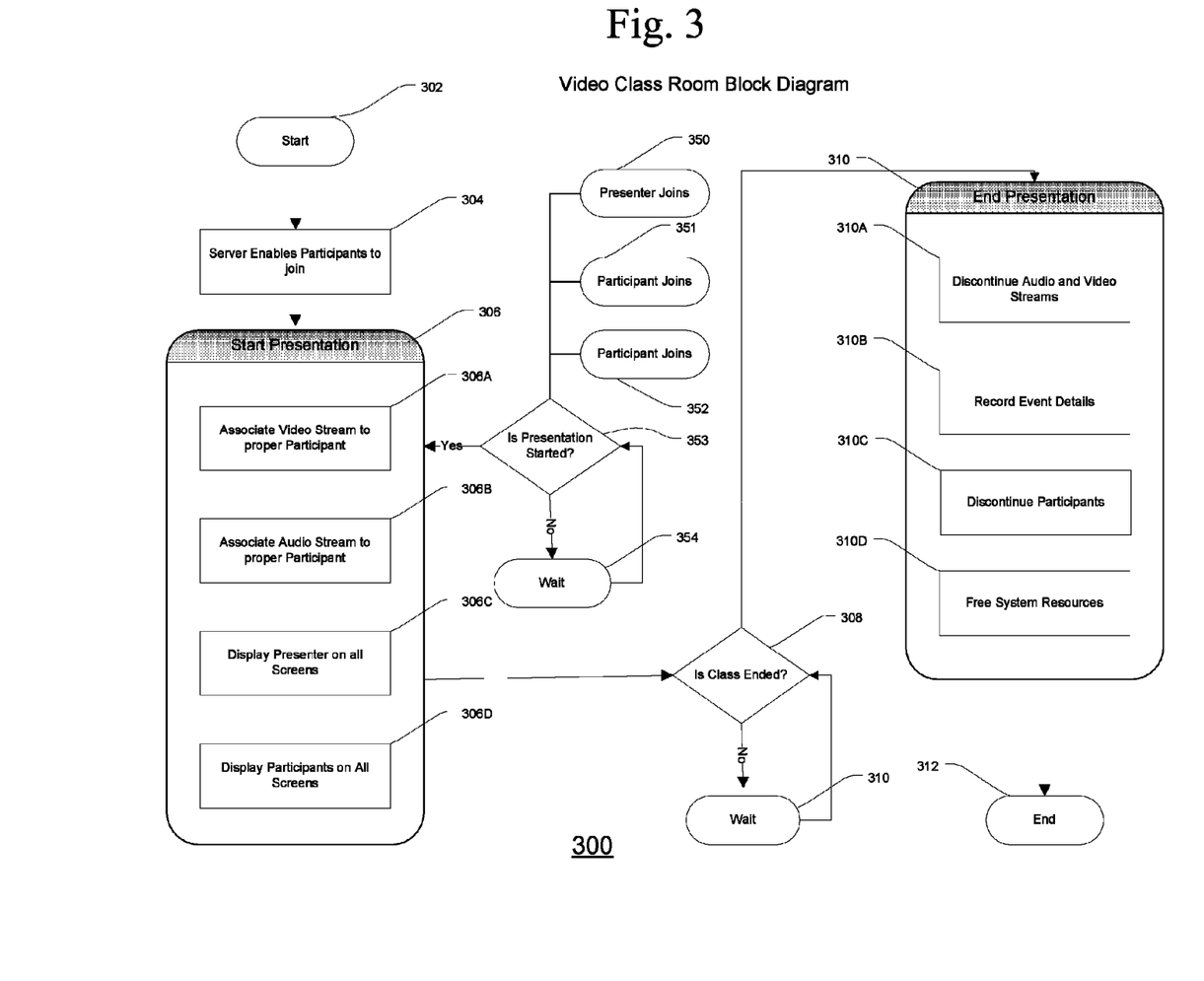

An exemplary flow diagram of a process 300 of operation of the system shown in FIG. 1*a* is shown in FIG. 3. It is best viewed in conjunction with FIGS. 1*a* and 1*b*. Process 300 begins with step 302. In step 304, the servers in network center 104 permit participants at participant computers 108A-N to join the presentation or conference. This may be done using the sub-process shown in steps 350-354. The sub-process begins with step 350, wherein the servers in network center 104 permit the presenter (or teacher or moderator) to join the presentation session, and with steps 351 and 352, wherein the servers in network center 104 permit the participants (or students, etc.) to join the presentation session. The joining of the presentation session may be accomplished using any conventional login, authorization, and/or authentication techniques. As the presenter and participants join the presentation session, in step 353, the servers in network center 104 monitor the session status to determine whether or not the presenter (or presentation administrator) has indicated that the presentation has started. If the presenter has not indicated that presentation has started, then, in step 354, the sub-process waits, then loops back to step 353. If the presenter has indicated that presentation has started, then the process continues with step 306, in which the presentation session is started.

In step 306, the presentation or conference session is started. In order to start the presentation or conference session, sub-steps 306A-D are performed. In step 306A, the servers in network center 104 associate video streams with each participant at each participant computer 108A-N. Likewise, in step 306B, the servers in network center 104 associate audio streams with each participant at each participant computer 108A-N. In step 306C, the presenter (or teacher or moderator) video is displayed, and the audio is played, to all participants at all participant computers 108A-N. In step 306D, the video of each participant is displayed, and the audio of each participant is played to the presenter and to the appropriate participant screens.

Once the presentation has started, process 300 continues with step 308, in which it is determined whether or not the presenter (or presentation administrator) has indicated that the presentation has ended. If the presenter has not indicated that presentation has ended, then, in step 310, the process waits, then loops back to step 308. If the presenter has not indicated that presentation has ended, then the process continues with step 310, in which the presentation session is ended.

In step 310, the presentation or conference session is ended. In order to end the presentation or conference session, sub-steps 310A-D are performed. In step 310A, the servers in network center 104 discontinue the audio and video streams associated with the presenter and with each participant. In step 310B, the details of the presentation, such as the participants, the times of participation, the text comments transmitted, etc., are recorded and/or transmitted to the appropriate parties. In step 310C, the participant sessions are discontinued. In step 310D, the system resources of the servers in network center 104 are freed.

In step 312, process 300 ends.

Figure 4:
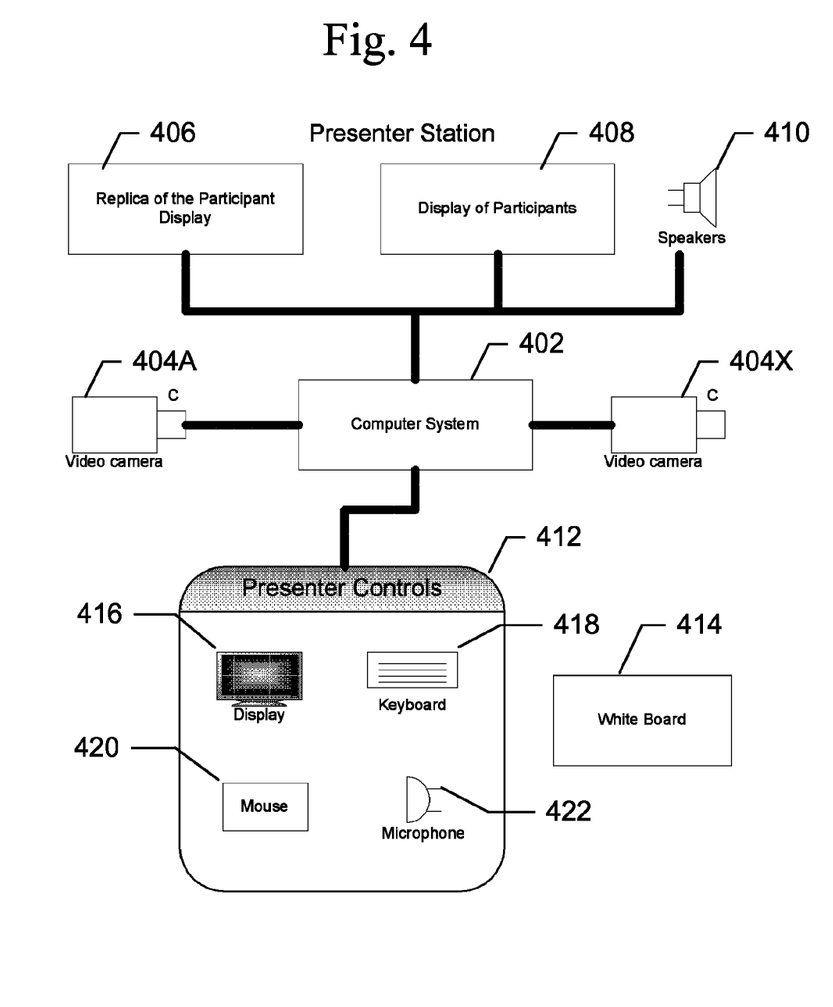

An exemplary block diagram of a presenter station 400 is shown in FIG. 4. Presenter station 400 includes computer system 402, video cameras 404A-X, displays 406 and 408, speakers 410, presenter controls 412, and white board 414. Computer system 402 provides the computation and processing power needed to operate presenter station 400 and is described in greater detail below. Video cameras 404A-X capture images of the presenter, white board 414, and any other persons or objects that may be part of the presentation. The images captured by video cameras 404A-X are processed by computer system 402 to form a plurality of video streams. Displays 406 and 408 display video to the presenter. In particular, display 406 displays a replica of the video stream that is transmitted and displayed to each participant, so that the presenter can monitor the presentation itself. Display 408 displays video of the participants in the presentation, so that the presenter can monitor the participants, for example, the reactions of the participants to the presentation, whether participants have questions, etc. Speakers 410 play audio of the participants to the presenter. An example of the coordination and operation of Display 408 and speakers 410 is shown in FIG. 2 and described above. White board 414 may be used for presentation purposes and is captured by one of video cameras 404A-X.

Presenter controls 412 provide the capability for the presenter to control the various aspects of the presentation. Presenter controls 412 may include display 416, keyboard 418, mouse 420, and microphone 422. Keyboard 418 and mouse 420 provide the presenter with the capability to input information to be presented and commands to control the presentation. Microphone 422 captures audio from the presenter. Display 416 displays all or portions of the presentation, as well as settings of various aspects of the presentation and results of commands that are entered to control the presentation.

Figure 5:
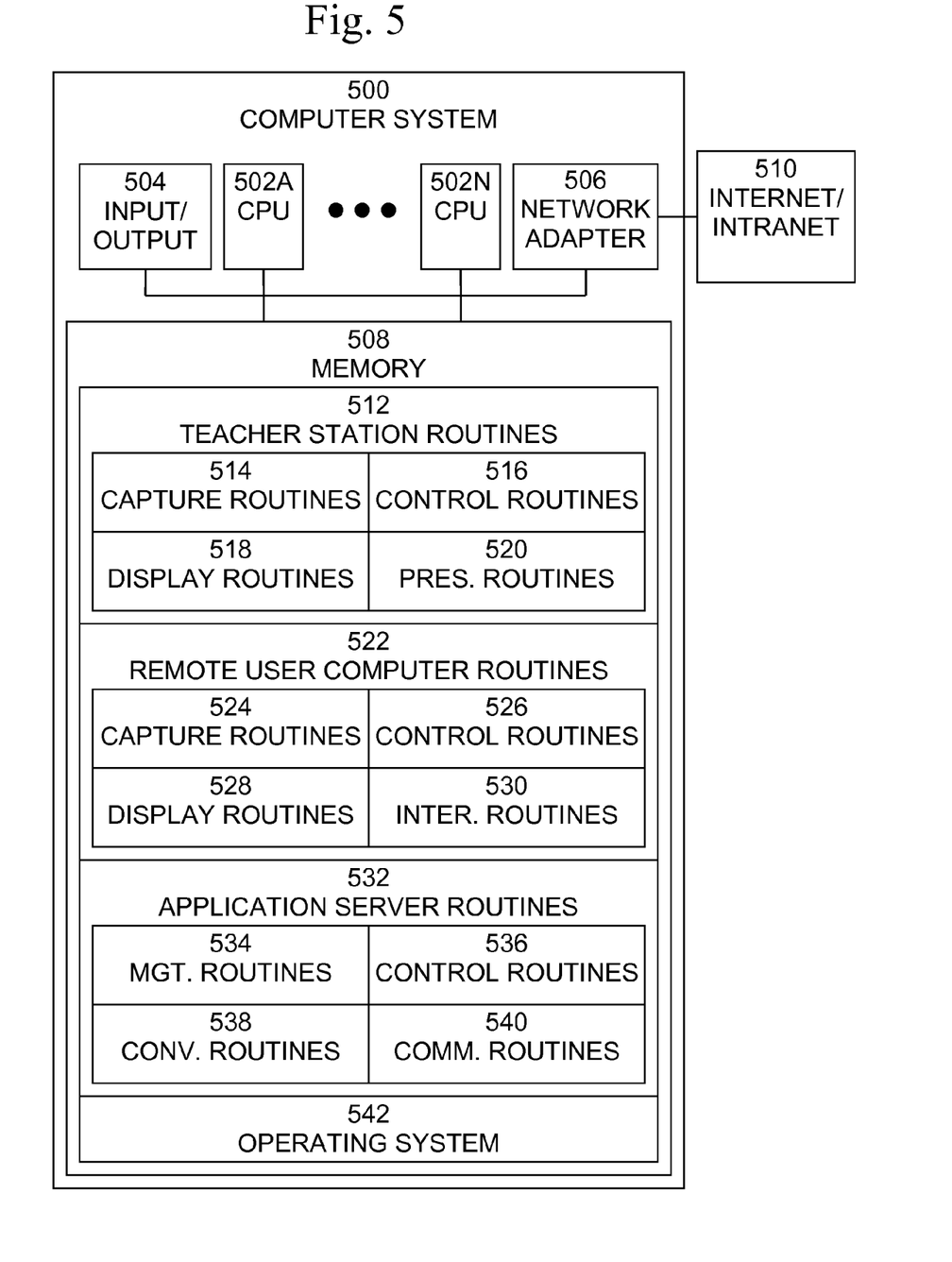
FIG. 5 is an exemplary block diagram of a computer system, such as a computer system used in a teacher station, a participant computer, or an application server.

An exemplary block diagram of a computer system 500, such as a computer system 402 used in a teacher station, a participant computer, or an application server, is shown in FIG. 5. Computer system 500 is typically a programmed general-purpose computer system, such as a personal computer, workstation, server system, and minicomputer or mainframe computer. Computer system 500 includes one and may include a plurality of processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present invention also contemplates embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces device 500 with network 510. Network 510 includes any communications network that is now in service or which may be developed in the future. Such a network may include one or more public or private communications networks, such as the Internet, wired or wireless telephone networks, wired or wireless data networks, local area networks, etc.

Memory 508 stores program instructions that are executed by, and data that are used and processed by, CPU 502 to perform the functions of computer system 500. Memory 508 may include electronic memory devices, such as randomaccess memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface, or Serial AT Attachment (SATA), or a variation or enhancement thereof.

The contents of memory 508 varies depending upon the function that computer system 500 is programmed to perform. For example, where computer system 500 is used in a teacher station, memory 508 may include teacher station routines 512, including capture routines 514, control routines 516, display routines 518, and presentation routines 520. Capture routines 514 capture video and audio of the presenter, white board, and other people or objects that are part of the presentation, and transmit the video and audio to the application servers in network center 104. Control routines 516 provide the capability for the presenter to control the operation of the presentation, such as indicating the start and end of the presentation, allowing participants to join, etc. Display routines 518 provide the display of video and audio information, such as a replica of the video stream that is transmitted and displayed to each participant, video of the participants in the presentation, audio of the participants in the presentation, etc. Presentation routines 520 provide the presenter with the capability to present elements of the presentation, such as displaying audio, video, images, text, etc, that are exhibits that form elements of the presentation.

As another example, where computer system 500 is a participant computer, memory 508 may include may include participant computer routines 522, including capture routines 524, control routines 526, display routines 528, and interaction routines 530. Capture routines 524 capture video and audio mainly of the participant, as well as any other people or objects that may be at the participant's location, and transmit the video and audio to the application servers in network center 104. Control routines 526 provide the capability for the participant to control the operation of the presentation, such as indicating that the participant want to join or leave the presentation, etc. Display routines 528 provide the display of video and audio information, such as the video stream that is transmitted and displayed to each participant, etc. Interaction routines 530 provide the participant with the capability to interact with the presenter and/or the presentation, such as by muting or unmuting the participant's audio, requesting to ask a question, sending text or audio messages to the presenter or one or more other participants, etc.

As another example, where computer system 500 is an application server, memory 508 may include may include application server routines 532, including management routines 534, control routines 536, conversion routines 538, and communication routines 540. Management routines 534 manage the presentations that are occurring, such as managing presenters and participants joining presentations, recording information about ongoing or completed presentations, etc. Control routines 536 provide the capability for the application server to control the operation of the presentation, such as which video and audio streams are transmitted where, which participants can interact with the presentation, etc. Conversion routines 538 convert the video and audio streams to the appropriate frame rate, resolution, encoding, protocol, etc. for transmission to and from the presenter and the participants. Communication routines 540 perform the transmission and reception of video and audio streams and signaling information.

Operating system 542 provides overall system functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable storage media include, floppy disks, hard disk drives, CD-ROMs, DVDROMs, RAM, flash memory, etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for providing video classroom presentation services comprising:
   receiving a real-time audio stream and a plurality of real-time video streams of a video classroom presentation, wherein at least some of the plurality of received video streams have at least two of different frame rates, resolutions, and encoding;
   receiving a real-time audio stream and a real-time video stream of each of a plurality of participants to the video classroom presentation, wherein the receiving comprises receiving a real-time text stream each of a plurality of participants to the video classroom presentation;

selectively transmitting the real-time audio stream and the plurality of real-time video streams of the video classroom presentation and the real-time audio stream and the real-time video stream of each of the plurality of participants to a video classroom presentation location and to each of the plurality of participants, wherein at least a plurality of real-time video streams are transmitted concurrently to each of the plurality of participants, wherein at least some of the plurality of transmitted real-time video streams have different frame rates, resolutions, or both;

receiving input from a presenter at a real-time interface, the input indicating a configuration of real-time audio streams and real-time video streams, the configuration including: a selection of at least one real-time audio stream and at least one real-time video stream to be transmitted to each of the plurality of participants, a selection of at least one real-time audio stream and at least one real-time video stream that is to be transmitted to each of the plurality of participants upon detection of at least one condition, and the at least one condition;

providing audio-video coordination using audio effects on at least one real-time audio stream transmitted to the video classroom presentation location to indicate a real-time video stream corresponding to the real-time audio stream;

wherein the frame rate, resolution, and encoding of each real-time video stream is determined, adjusted, or converted in real-time before and during transmission of each real-time video stream depending on the subject matter of the real-time video stream and the number of real-time audio streams and real-time video streams received from participants in order to provide a determined service or quality of service.

2. The method of claim 1, wherein each of the audio stream and the plurality of video streams of the video classroom presentation and the audio stream and the video stream of each of the plurality of participants is selectively independently transmitted to the video classroom presentation location and to each of the plurality of participants.

3. The method of claim 1, wherein each of the audio stream and the plurality of video streams of the video classroom presentation and the audio stream and the video stream of each of the plurality of participants is selectively transmitted as a one-to-one, a one-to-maw, a many-to-one, or a maw-to-many transmission.

4. The method of claim 3, wherein each of the audio stream and the plurality of video streams of the video classroom presentation and the audio stream and the video stream of each of the plurality of participants is further selectively independently transmitted to the video classroom presentation location and to each of the plurality of participants.

5. The method of claim 1, wherein the audio stream and the plurality of video streams of the video classroom, presentation are captured using a computer system at the video classroom presentation location, the audio stream and the video stream of each of a plurality of participants to the video classroom presentation are captured using a computer system at each participant location, all of the audio stream and the plurality of video streams of the video classroom presentation and the audio stream and the video stream of each of the plurality of participants are transmitted to a network server.

6. The method of claim 5, wherein the network server selectively transmits the received audio stream and plurality of video streams of the video classroom presentation and audio stream and video stream of each of the plurality of participants to the video classroom presentation location and to each of the plurality of participants.

7. The method of claim 1, wherein the selection of transmission of the audio stream and the plurality of video streams of the video classroom presentation and the audio stream and the video stream of each of the plurality of participants is controlled using the computer system at the video classroom presentation location.

8. The method of claim 1, further comprising:
providing audio-video coordination using audio effects on at least one real-time audio stream transmitted to the video classroom presentation location to indicate a real-time video stream corresponding to the real-time audio stream.

9. The method of claim 1, wherein the condition comprises detecting a higher audio volume in at least one of the real-time audio streams.

10. The method of claim 1, wherein the receiving a real-time audio stream and a real-time video stream of each of a plurality of participants to the video classroom presentation further comprises receiving a real-time text stream each of a plurality of participants to the video classroom presentation.

11. A computer program product for providing video classroom presentation services comprising a non-transitory computer readable storage medium and computer program instructions, recorded on the non-transitory computer readable medium and executable by, a processor, for performing:

receiving a real-time audio stream and a plurality of real-time video streams of a video classroom presentation, wherein at least some of the plurality of received video streams have at least two of different frame rates, resolutions, and encoding;

receiving a real-time audio stream and a real-time video stream of each of a plurality of participants to the video classroom presentation, wherein the receiving comprises receiving a real-time text stream each of a plurality of participants to the video classroom presentation;

selectively transmitting the real-time audio stream and the plurality of real-time video streams of the video classroom presentation and the real-time audio stream and the real-time video stream of each of the plurality of participants to a video classroom presentation location and to each of the plurality of participants, wherein at least a plurality of real-time video streams are transmitted concurrently to each of the plurality of participants, wherein at least some of the plurality of transmitted real-time video streams have different frame rates, resolutions, or both;

receiving input from a presenter at a real-time interface, the input indicating a configuration of real-time audio streams and real-time video streams, the configuration including: a selection of at least one real-time audio stream and at least one real-time video stream to be transmitted to each of the plurality of participants, a selection of at least one real-time audio stream and at least one real-time video stream that is to be transmitted to each of the plurality of participants upon detection of at least one condition, and the at least one condition;

providing audio-video coordination using audio effects on at least one real-time audio stream transmitted to the video classroom presentation location to indicate a real-time video stream corresponding to the real-time audio stream;

wherein the frame rate, resolution, and encoding of each real-time video stream is determined, adjusted, or converted in real-time before and during transmission of each real-time video stream depending on the subject matter of the real-time video stream and the number of real-time audio streams and real-time video streams received from participants in order to provide a determined service or quality of service.

12. The computer program product of claim 11, wherein each of the audio stream and the plurality of video streams of the video classroom presentation and the audio stream and the video stream of each of the plurality of participants is selectively independently transmitted to the video classroom presentation location and to each of the plurality of participants.

13. The computer program product of claim 11, wherein each of the audio stream and the plurality of video streams of the video classroom presentation and the audio stream and the video stream of each of the plurality of participants is selectively transmitted as a one-to-one, a one-to-many, a many-to-one, or a many-to-many transmission.

14. The computer program product of claim 13, wherein each of the audio stream and the plurality of video streams of the video classroom presentation and the audio stream and the video stream of each of the plurality of participants is further selectively independently transmitted to the video classroom presentation location and to each of the plurality of participants.

15. The computer program product of claim 11, wherein the audio stream and the plurality of video streams of the video classroom presentation are captured using a computer system at the video classroom presentation location, the audio stream and the video stream of each of a plurality of participants to the video classroom presentation are captured using a computer system at each participant location, all of the audio stream and the plurality, of video streams of the video classroom presentation and the audio stream and the video stream of each of the plurality of participants are transmitted to a network server.

16. The computer program product of claim 15, wherein the network server selectively transmits the received audio stream and plurality of video streams of the video classroom presentation and audio stream and video stream of each of the plurality of participants to the video classroom presentation location and to each of the plurality, of participants.

17. The computer program product of claim 11, wherein the selection of transmission of the audio stream and the plurality of video streams of the video classroom presentation and the audio stream and the video stream of each of the plurality of participants is controlled using the computer system at the video classroom, presentation location.

18. The computer program product of claim 11, further comprising:
providing audio-video coordination using audio effects on at least one real-time audio stream transmitted to the video classroom presentation location to indicate a real-time video stream corresponding to the real-time audio stream.

19. The method of claim 11, wherein the condition comprises detecting a higher audio volume in at least one of the real-time audio streams.

20. The method of claim 11, wherein the receiving a real-time audio stream and a real-time video stream of each of a plurality of participants to the video classroom presentation further comprises receiving a real-time text stream each of a plurality of participants to the video classroom presentation.

21. A system for providing video classroom, presentation services comprising:
a computer system at a video classroom presentation location to capture a real-time audio stream and a plurality of real-time video streams of a video classroom presentation and transmit the captured real-time audio stream and plurality of real-time video streams to a network server, wherein at least some of the plurality of received video streams have at least two of different frame rates, resolutions, and encoding;
a plurality of computer systems, each computer system at a participant location, to capture the real-time audio stream and the real-time video stream of each of a plurality of participants to the presentation, and to transmit each captured real-time audio stream and real-time video stream to the network server;
and a network server to receive the real-time audio stream and the plurality of real-time video streams of the video classroom presentation and the real-time audio stream and the real-time video stream of each of the plurality of participants to the video classroom presentation and to selectively transmit the received real-time audio stream and plurality of real-time video streams of the video classroom presentation and real-time audio stream and real-time video stream of each of the plurality of participants to the computer system at the video classroom presentation location and to each computer system at each of the plurality of participant locations, wherein at least a plurality of real-time video streams are transmitted concurrently to each of the plurality of participants, wherein at least some of the plurality of transmitted video streams have different frame rates, resolutions, or both, and wherein the receiving the real-time audio stream and the real-time video stream of each of the plurality of participants to the video classroom presentation comprises receiving a real-time text stream each of a plurality of participants to the video classroom presentation;
wherein the network server further receives input from a presenter at a real-time interface, the input indicating a configuration of real-time audio streams and real-time video streams, the configuration including: a selection of at least one real-time audio stream and at least one real-time video stream to be transmitted to each of the plurality of participants, a selection of at least one real-time audio stream and at least one real-time video stream that is to be transmitted to each of the plurality of participants upon detection of at least one condition, and the at least one condition;
wherein the network server further provides audio-video coordination using audio effects on at least one real-time audio stream transmitted to the video classroom presentation location to indicate a real-time video stream corresponding to the real-time audio stream;
wherein the frame rate, resolution, and encoding of each real-time video stream is determined, adjusted, or converted in real-time before and during transmission of each real-time video stream depending on the subject matter of the real-time video stream and the number of real-time audio streams and real-time video streams received from participants in order to provide a determined service or quality of service.

22. The system of claim 21, wherein each of the audio stream and the plurality of video streams of the video classroom, presentation and the audio stream and the video stream of each of the plurality of participants is selectively independently transmitted to the computer system at the video classroom presentation location and to each computer system at each of the plurality of participant locations.

23. The system of claim 21, wherein each of the audio stream and the plurality of video streams of the video classroom presentation and the audio stream and the video stream of each of the plurality of participants is selectively transmitted as a one-to-one, a one-to-many, a many-to-one, or a many-to-many transmission.

24. The system of claim 23, wherein each of the audio stream and the plurality of video streams of the video classroom presentation and the audio stream and the video stream of each of the plurality of participants is further selectively independently transmitted to the video classroom presentation location and to each of the plurality of participants.

25. The system of claim 24, wherein the network server selectively transmits the received audio stream and plurality of video streams of the video classroom presentation and audio stream and video stream of each of the plurality of participants to the video classroom, presentation location and to each of the plurality of participants.

26. The system of claim 21, wherein the selection of transmission of the audio stream and the plurality of video streams of the video classroom presentation and the audio stream and the video stream of each of the plurality of participants is controlled using the computer system at the video classroom, presentation location.

27. The system of claim 21, further comprising:
providing audio-video coordination using audio effects on at least one real-time audio stream transmitted to the video classroom presentation location to indicate a real-time video stream corresponding to the real-time audio stream.

28. The method of claim 21, wherein the condition comprises detecting a higher audio volume in at least one of the real-time audio streams.

29. The method of claim 21, wherein the receiving a real-time audio stream and a real-time video stream of each of a plurality of participants to the video classroom presentation further comprises receiving a real-time text stream each of a plurality of participants to the video classroom presentation.

30. A server system for providing video classroom, presentation services comprising a processor to execute program instructions, a memory, to store computer program instructions executable by the processor, and computer program instructions stored in the memory and executable to perform;
receiving a real-time audio stream and a plurality of real-time video streams of a video classroom presentation, wherein at least some of the plurality of received video streams have at least two of different frame rates, resolutions, and encoding;
receiving a real-time audio stream and a real-time video stream of each of a plurality of participants to the video classroom presentation, wherein the receiving comprises receiving a real-time text stream each of a plurality of participants to the video classroom presentation;
selectively transmitting the real-time audio stream and the plurality of real-time video streams of the video classroom presentation and the real-time audio stream and the real-time video stream of each of the plurality of participants to a video classroom presentation location and to each of the plurality of participants, wherein at least a plurality of real-time video streams are transmitted concurrently to each of the plurality of participants, wherein at least some of the plurality of transmitted real-time video streams have different frame rates, resolutions, or both;
receiving input from a presenter at a real-time interface, the input indicating a configuration of real-time audio streams and real-time video streams, the configuration including: a selection of at least one real-time audio stream and at least one real-time video stream to be transmitted to each of the plurality of participants, a selection of at least one real-time audio stream and at least one real-time video stream that is to be transmitted to each of the plurality of participants upon detection of at least one condition, and the at least one condition;
providing audio-video coordination using audio effects on at least one real-time audio stream transmitted to the video classroom presentation location to indicate a real-time video stream corresponding to the real-time audio stream;
wherein the frame rate, resolution, and encoding of each real-time video stream is determined, adjusted, or converted in real-time before and during transmission of each real-time video stream depending on the subject matter of the real-time video stream and the number of real-time audio streams and real-time video streams received from participants in order to provide a determined service or quality of service.

31. The computer program product of claim 30, wherein each of the audio stream and the plurality of video streams of the video classroom presentation and the audio stream and the video stream of each of the plurality of participants is selectively independently transmitted to the video classroom presentation location and to each of the plurality of participants.

32. The computer program product of claim 30, wherein each of the audio stream and the plurality, of video streams of the video classroom presentation and the audio stream and the video stream of each of the plurality of participants is selectively transmitted as a one-to-one, a one-to-many, a many-to-one, or a many-to-many transmission.

33. The computer program product of claim 32, wherein each of the audio stream and the plurality of video streams of the video classroom presentation and the audio stream and the video stream of each of the plurality of participants is further selectively independently transmitted to the video classroom presentation location and to each of the plurality, of participants.

34. The computer program product of claim 30, wherein the audio stream and the plurality of video streams of the video classroom presentation are captured using a computer system at the video classroom presentation location, the audio stream and the video stream of each of a plurality of participants to the video classroom,
presentation are captured using a computer system at each participant location, all of the audio stream and the plurality of video streams of the video classroom presentation and the audio stream and the video stream of each of the plurality of participants are transmitted to the server system.

35. The computer program product of claim 34, wherein the server system selectively transmits the received audio stream and plurality of video streams of the video classroom presentation and audio stream and video stream of each of the plurality of participants to the video classroom presentation location and to each of the plurality of participants.

36. The computer program product of claim 30, wherein the selection of transmission of the audio stream and the plurality of video streams of the video classroom presentation and the audio stream and the video stream of each of the plurality of participants is controlled using the computer system at the video classroom, presentation location.

37. The server system of claim 30, further comprising:
providing audio-video coordination using audio effects on at least one real-time audio stream transmitted to the video classroom presentation location to indicate a real-time video stream corresponding to the real-time audio stream.

38. The method of claim 30, wherein the condition comprises detecting a higher audio volume in at least one of the real-time audio streams.

39. The method of claim 30, wherein the receiving a real-time audio stream and a real-time video stream of each of a plurality of participants to the video classroom presentation further comprises receiving a real-time text stream each of a plurality of participants to the video classroom presentation.

* * * * *